Aug. 4, 1925.　　　　　　　　　　　　　　　　　1,548,335

T. W. SELSER

WHEEL RIM CONSTRUCTION

Filed Nov. 10, 1923

INVENTOR:
Thomas W. Selser,
By Graham & Harris
ATTORNEYS.

Patented Aug. 4, 1925.

1,548,335

UNITED STATES PATENT OFFICE.

THOMAS W. SELSER, OF HUNTINGTON PARK, CALIFORNIA, ASSIGNOR TO EMSCO STEEL PRODUCTS COMPANY, A CORPORATION OF CALIFORNIA.

WHEEL-RIM CONSTRUCTION.

Application filed November 10, 1923. Serial No. 673,944.

*To all whom it may concern:*

Be it known that I, THOMAS W. SELSER, a citizen of the United States, residing at Huntington Park, in the county of Los Angeles, State of California, have invented a new and useful Wheel-Rim Construction, of which the following is a specification.

This invention relates to the construction of wheels of the type used in the oil producing industry and relates particularly to the construction of wheels of the character commonly known as bull wheels or calf wheels.

Such wheels are generally mounted on a shaft with a drum or reel and afford means whereby they may be rotated by a rope belt from the tug wheel associated with the band wheel of a derrick equipment. Such wheels have been commonly made of wood and the deterioration thereof is comparatively rapid. Owing to the relatively short life of wood wheels, attention has lately been directed toward the provision of steel wheels for this use.

It is the principal object of the invention to provide a novel means of forming the rim of a steel bull wheel or other wheel of a similar character, and further to provide an efficient and economical method for securement of a rim to the spoke extremities.

The advantages of the invention and further objects thereof will be made evident hereinafter.

Referring to the drawing which is for illustrative purposes only:

Figure 1:
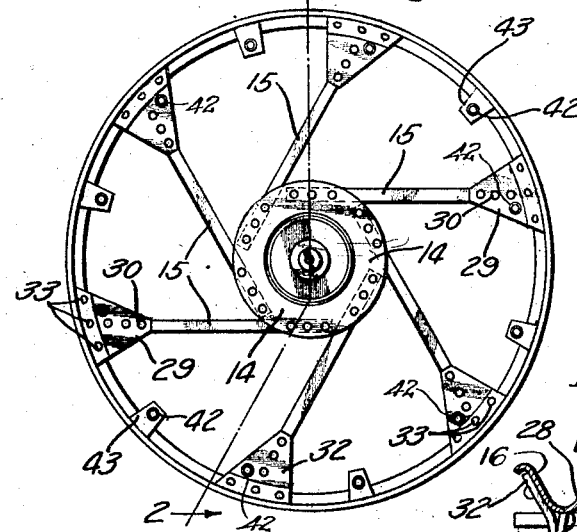
Fig. 1 is an elevation of a wheel equipped with a rim construction embodying the features of my invention.

In the construction of the steel wheel suitable for incorporation with the rim construction constituting my invention, there is employed a barrel 11 having gudgeons 12 in the ends thereof, annularly formed angle members 13, ring plates 14, and spokes 15 consisting of structural channels mounted in tangentially extending position. This tangential arrangement permits the use of a greater number of rivets than would be possible were the spokes extended radially.

A rim 20 is provided, this rim being formed of sheet metal in the form of a double groove. For convenience in definition, the rim 20 may be considered as made up of four conoidal plates 16, 17, 18, and 19 although in practice the four plates 16, 17, 18 and 19 are a unitary structure composed of one plate.

In order that the rigidity of the wheel and the resistance thereof against lateral pressure shall be ample for the working conditions, it is necessary that the inner ends or bases of the spokes be fairly broad. The rim 20, however, has two grooves 22 over which the driving rope runs. The spacing between the bottoms 23 of the grooves 22 is therefore considerably narrower than the width of the channels 15. It is at these bottoms 23 that the greatest pressure due to the passing of a rope over the grooves is exerted and to provide maximum strength in construction, the flanges 25 of the channel spokes 15 should abut against the bottoms 23 so that a broad surface will be presented to receive the pressure of the driving rope.

I accomplish this construction by converging the ends of the channel members in such a manner that the ends of the flanges 25 will rest in the position shown, the webs 27 thereof being provided with a contour corresponding to the under face of the conoidal plates 17 and 18 as indicated at 28. Triangularly shaped gusset plates 29 are riveted at 30 to the end portions of the flanges 25 and the outer edges 32 of these gusset plates are then riveted at 33 to the outer conoidal plates 16 and 19 of the rim. This construction is simple, yet very rigid, owing to the fact that the application of stresses from the rim member are efficiently applied to the section of the channels constituting the spokes.

Figure 3:
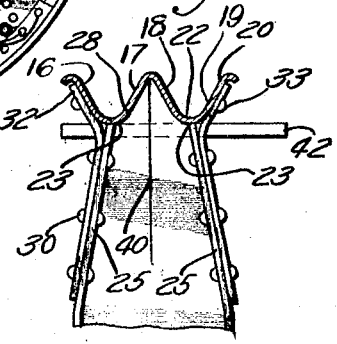
Fig. 3 is an enlarged fragmentary detail showing the manner in which the rim is secured to the spokes.
Figure 2:
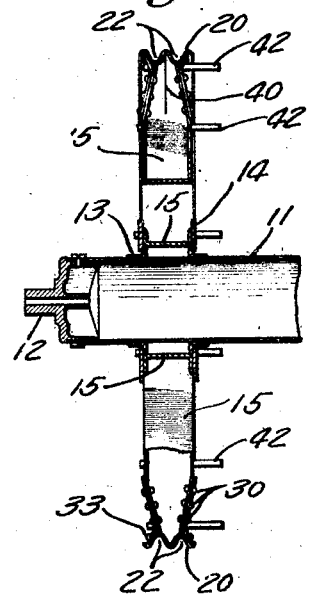
Fig. 2 is a section through the wheel taken as indicated by the line 2—2 of Fig. 1.
Figure 4:
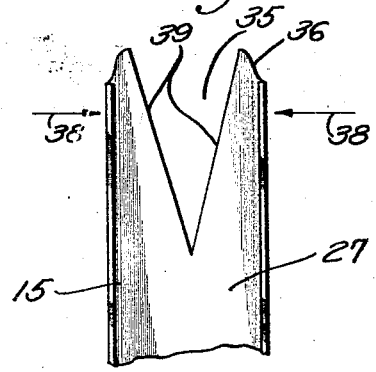
Fig. 4 is a fragmentary elevation showing the preparation of the end of a spoke preliminary to forming into condition to receive the rim.

The preferred manner in which the ends of the channel spokes 15 are converged is illustrated in Fig. 4. The end of the channel web is notched out as indicated at 35 and the web 27 may be provided with the contour 36 whereupon the ends of the channels 15 are forced inwardly as indicated by the arrows 38, thus bringing the sides 39 of the notch 35 into abutment as indicated at 40 in Figs. 2 and 3. The seam shown at 40 may if desired be welded and it may also be desirable to weld the ends of the spokes 15 to the under side of the rim 20. This welding provides an extremely rigid construction, but is not absolutely necessary in design of the device as the structure is otherwise inherently of great rigidity.

In the drawing, pipe handles 42 are shown welded through the gusset plates and through small brackets 43; which handles do not form a part of the invention but may be conveniently secured to the wheel in conjunction with the novel structure provided.

I claim as my invention:

1. In a wheel, the combination of: a rim formed of a web of metal bent into sinuous cross sectional contour so as to provide adjacent grooves; a hub member; and spokes extending outwardly from said hub member, said spokes each having an axially extending web and flanges coextensive with the edges of said web, said spokes being reduced in width at their outer ends so that said flanges will abut substantially against the outer groove bottoms of said rim.

2. In a wheel, the combination of: a rim formed of a web of metal bent into sinuous cross sectional contour so as to provide adjacent grooves; a hub member; spokes extending outwardly from said hub member, said spokes each having an axially extending web and flanges coextensive with the edges of said web, said spokes being reduced in width at their outer ends so that said flanges will abut substantially against the outer groove bottoms of said rim; and gusset plates, each secured to one of said flanges and having its outer edge bent outwardly so as to lie against the sloping side of said rim to which it is secured.

3. In a wheel, the combination of: a rim formed of a web of metal bent into sinuous cross sectional contour so as to provide adjacent grooves; a hub member; and spokes extending outwardly from said hub member, said spokes each having an axially extending web and flanges coextensive with the edges of said web, the ends of said webs being notched and the ends of said spokes then bent inwardly to a reduced width so that said flanges will abut substantially against the outer groove bottoms of said rim.

4. In a wheel, the combination of: a rim formed of a web of metal bent into sinuous cross sectional contour so as to provide adjacent grooves; a hub member; spokes extending outwardly from said hub member, said spokes each having an axially extending web and flanges coextensive with the edges of said web, the ends of said webs being notched and the ends of said spokes then bent inwardly to a reduced width so that said flanges will abut substantially against the outer groove bottoms of said rim; and gusset plates, each secured to one of said flanges and having its outer edge bent outwardly so as to lie against the sloping side of said rim to which it is secured.

In testimony whereof, I have hereunto set my hand at Los Angeles, California, this 1st day of November, 1923.

THOMAS W. SELSER.